United States Patent
Hirose

(10) Patent No.: US 8,355,900 B2
(45) Date of Patent: Jan. 15, 2013

(54) METHOD AND APPARATUS FOR ANALYZING PANICLE STRUCTURE

(75) Inventor: Yoshitsugu Hirose, Wako (JP)

(73) Assignee: Honda Motor Co. Ltd., Tokyo (JP)

( * ) Notice: Subject to any disclaimer, the term of this patent is extended or adjusted under 35 U.S.C. 154(b) by 590 days.

(21) Appl. No.: 12/571,705

(22) Filed: Oct. 1, 2009

(65) Prior Publication Data

US 2010/0142751 A1   Jun. 10, 2010

Related U.S. Application Data

(60) Provisional application No. 61/136,786, filed on Oct. 3, 2008.

(30) Foreign Application Priority Data

Oct. 22, 2008   (JP) ................................. 2008-272462

(51) Int. Cl.
  *G06G 7/48* (2006.01)
  *G01N 33/48* (2006.01)
(52) U.S. Cl. .......................................... 703/11; 702/19
(58) Field of Classification Search .................. None
  See application file for complete search history.

(56) References Cited

U.S. PATENT DOCUMENTS

2005/0192760 A1 * 9/2005 Dunlap ........................ 702/19

FOREIGN PATENT DOCUMENTS

| JP | 2001-034619 | 2/2001 |
| JP | 2002-312762 | 10/2002 |
| JP | 2005-055245 | 3/2005 |
| JP | 2005-083775 | 3/2005 |
| JP | 2006-087934 | 4/2006 |

OTHER PUBLICATIONS

Ferraro et al. (Fractals, 2005, 13, 91-109).*

* cited by examiner

*Primary Examiner* — Larry D Riggs, II
(74) *Attorney, Agent, or Firm* — Squire Sanders (US) LLP

(57) ABSTRACT

An analysis apparatus that analyzes a branching structure of a panicle includes an image capturing unit that captures a panicle image; a portion extracting unit that extracts branches and seed grains from the panicle image; a branching-state determination unit that determines a branching state of the branches; and a data file that has a tree structure corresponding to the branching state of the branches, wherein the branching-state determination unit stores the branching state of the branches in the data file.

8 Claims, 16 Drawing Sheets

METHOD AND APPARATUS FOR ANALYZING PANICLE STRUCTURE

BACKGROUND OF THE INVENTION

1. Field of the Invention

The present invention relates to a method and an apparatus for analyzing a branching structure of a panicle.

2. Description of the Related Art

A technique called QTL (Quantitative Trait Locus) analysis is adopted in plant breeding of plants including crops such as rice. In the QTL analysis, a useful property such as plant morphology is digitized and compared to a genetic type, and thereby estimating where in a chromosome a gene involved in the property is located. For example, properties such as rice panicle morphology, the number of seed grains, and heading dates are used as parameters in the rice QTL analysis.

However, because the rice panicle morphology is complicated, conventionally manual measurement was required for digitizing the rice panicle morphology as the parameters. Specifically, one panicle is manually spread to measure the number of branches, a branching state of the branches, a length of the branches, the number of the seed grains, and "fertility" and "sterility" of the seed grains. A long time and skilled work were required to perform the manual work.

Recently there has been developed an apparatus that measures and selects a shape of the seed grain (for example, see Japanese Patent Application Laid-Open Nos. 2002-312762 and 2005-55245). However, unlike the seed grain, the rice panicle has a stereoscopic, complicated structure. Although X-ray CT (Computed Tomography) or MRI (Magnetic Resonance Imaging) is also used as the method for analyzing the stereoscopic structure, the apparatus is large and an amount of processed data becomes huge and therefore the apparatus is not for general purpose use. Thus, the general-purpose analysis method and analysis apparatus for analyzing the structure of the panicle, such as the rice panicle, which includes a branching state of the branches, have not been developed yet.

Accordingly, there is a need for the general-purpose analysis method and analysis apparatus for analyzing the panicle morphology of the branching structure of the panicle such as the rice panicle.

SUMMARY OF THE INVENTION

In accordance with a first aspect of the invention, an analysis method for analyzing a branching structure of a panicle includes capturing a panicle image; extracting branches and seed grains from the panicle image; and determining a branching state of the branches; wherein determining the branching state of the branches includes storing the branching state of the branches in a data file, the data file having a tree structure corresponding to the branching state of the branches.

In accordance with a second aspect of the invention, an analysis apparatus that analyzes a branching structure of a panicle includes an image capturing unit that captures a panicle image; a portion extracting unit that extracts branches and seed grains from the panicle image; a branching-state determination unit that determines a branching state of the branches; and a data file that has a tree structure corresponding to the branching state of the branches, wherein the branching-state determination unit stores the branching state of the branches in the data file.

In accordance with the aspects of the invention, the data file having the tree structure corresponding to the branching state of the branch is used, so that the branching state of the branch of the panicle can be recognized without use of the complicated logic. Therefore, the aspects of invention provide a general-purpose analysis method and a general-purpose a general-purpose analysis apparatus for analyzing the panicle morphology of the rice panicle including the branching state of the branches.

The features of the embodiments of the invention are as follows.

In the analysis method in accordance with an embodiment of the invention, determining the branching state of the branches includes: setting a root of the panicle to an upstream side; determining an initial starting point on a branch near the root of the panicle; setting a branching point of the branch or an edge point of the branch on a downstream side of the initial starting point to an end point, the branching point or the edge point being next to the initial starting point, the edge point being a point at which a seed grain is produced; setting a region from the initial starting point to the end point to a branch component; determining another branch component while the end point is set to a new starting point when the end point is a branching point; and dividing the whole of the branches of the panicle into branch components.

Accordingly, the panicle structure including the branching state of the branch can easily be analyzed by dividing the whole of the branches of the panicle into the branch components.

In the analysis method in accordance with another embodiment of the invention, the data file includes point tags corresponding to all the branching points and edge points, a point tag corresponding to a branching point includes a point tag corresponding to an end point of a branch component, in which the branching point is set to a starting point, as a subelement, and the point tags corresponding to all the branching points and edge points have information on a length from the next, upstream branching point and form a tree structure.

Accordingly, the point tags corresponding to the branching points and edge points are joined by a parent and child relationship, that is, a hierarchical relationship in which the parent is set to an upper level while the child is set to a lower level, so that the data file having the tree structure corresponding to the branching state of the branch can easily be produced.

In the analysis method in accordance with another embodiment of the invention, a point tag corresponding to a branching point or an edge point have information on the branching point or edge point and information on the branch component in which the branching point or edge point is set to an end point.

Accordingly, the branch information can easily be stored in the data file having the tree structure corresponding to the branching state of the branches.

In the analysis method in accordance with another embodiment of the invention, a point tag corresponding to an edge point has information on a seed grain as a subelement.

Accordingly, the seed grain information can easily be stored in the data file having the tree structure corresponding to the branching state of the branches.

In the analysis method in accordance with another embodiment of the invention, the information on the seed grain includes character information indicating a seed grain state as the subelement.

Accordingly, the character information indicating the seed grain state can be utilized while combined with the information on the panicle structure.

In the analysis method in accordance with another embodiment of the invention, determining the branching state of the branches includes: setting a branch including a branch component to a main branch located on a downstream side of a starting point, the branch component connecting an edge point and the starting point, the edge point having a longest distance from the starting point; and setting a branch bifurcated from the main branch to a bifurcated branch of the main branch.

Accordingly, the main branch and the branched branch can automatically be discriminated from each other.

In the analysis method in accordance with another embodiment of the invention, the data file includes point tags corresponding to all the branching points and edge points, a point tag corresponding to a branching point includes a point tag corresponding to an end point of the branch component, in which the branching point is set to a starting point, as a subelement, the point tag corresponding to the branching point or edge point has information on the branching point or edge point and information on the branch component in which the branching point or edge point is set to an end point, and the information on the branch component includes information whether the branch component is a main branch or a bifurcated branch.

Accordingly, the information on the determination whether the branch component is the main branch or the branched branch can be utilized while combined with the information on another panicle structure.

DETAILED DESCRIPTION OF THE INVENTION

Figure 1:
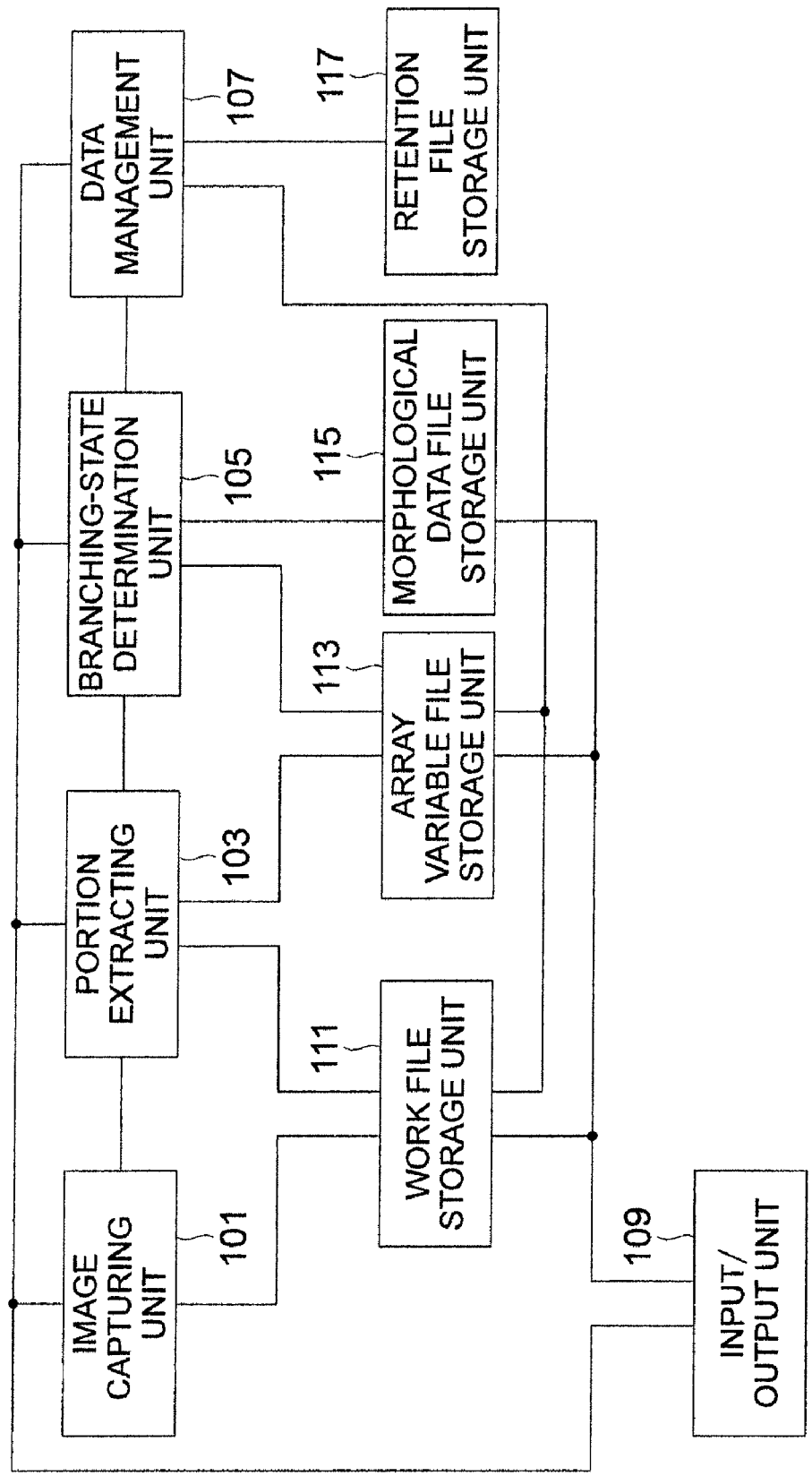
FIG. 1 illustrates a configuration of an analysis apparatus according to an embodiment of the invention.

FIG. 1 illustrates a configuration of an analysis apparatus according to an embodiment of the invention. Referring to FIG. 1, the analysis apparatus includes an image capturing unit 101 that captures a panicle image, a portion extracting unit 103 that extracts branches and seed grains of the panicle, a branching-state determination unit 105 that defines a branch branching state of the panicle, a data management unit 107 in which post-processing data is stored, and an input/output unit 109 that manages input/output processing. The analysis apparatus also includes a work file storage unit 111, an array variable file storage unit 113, a morphological data file storage unit 115, and a retention file storage unit 117, which are of a storage device. The image capturing unit 101 may include a scanner. The portion extracting unit 103, the branching-state determination unit 105, the data management unit 107, the input/output unit 109, and the storage units may include a computer such as one or plural personal computers.

Figure 2:
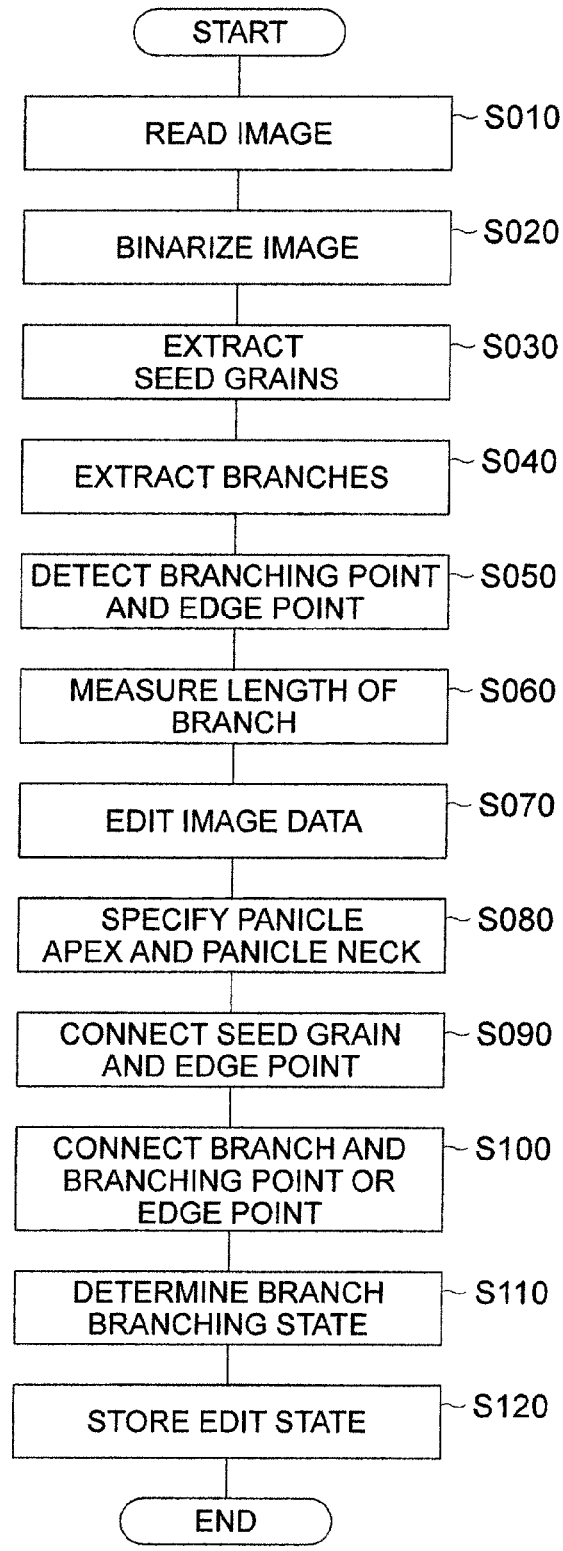
FIG. 2 is a flowchart illustrating an analysis method of the embodiment of the invention.

FIG. 2 is a flowchart illustrating an analysis method of the embodiment of the invention. The image capturing unit 101 performs processing in Step S010 of FIG. 2. The portion extracting unit 103 performs pieces of processing in Steps S020 to S100 of FIG. 2. The branching-state determination unit 105 performs processing in Step S110 of FIG. 2. The data management unit 107 performs processing in Step S120 of FIG. 2.

In Step S010 of FIG. 2, the image capturing unit 101 reads the panicle image. The panicle is spread before the panicle image is read, and the branches and the seed grains are manually pasted onto a transparent film so as not to overlap each other. The image capturing unit 101 includes a transmission type scanner. The scanner preferably has resolution of 300 to 600 dpi (dpi is the number of pixels per one inch). Although measuring resolution performance is enhanced with increasing resolution, a scanning time and an analysis time become lengthened and a memory load is increased. The reason the transmission type scanner is used is that the use of a reflection type scanner generates a shadow to cause a measurement error or a read mistake. The image capturing unit 101 stores the read image in the work file 111.

In Step S020 of FIG. 2, the portion extracting unit 103 binarizes the image read by the image capturing unit 101. The portion extracting unit 103 stores the binarized image in the work file 111.

Figure 15:
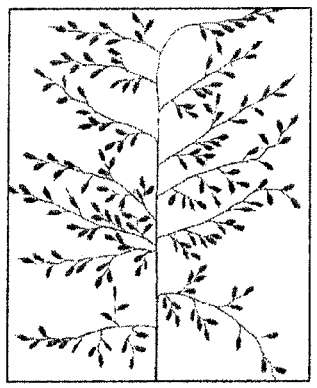
FIG. 15 illustrates an example of a binarized panicle image.

FIG. 15 illustrates an example of the binarized panicle image.

Figure 3:
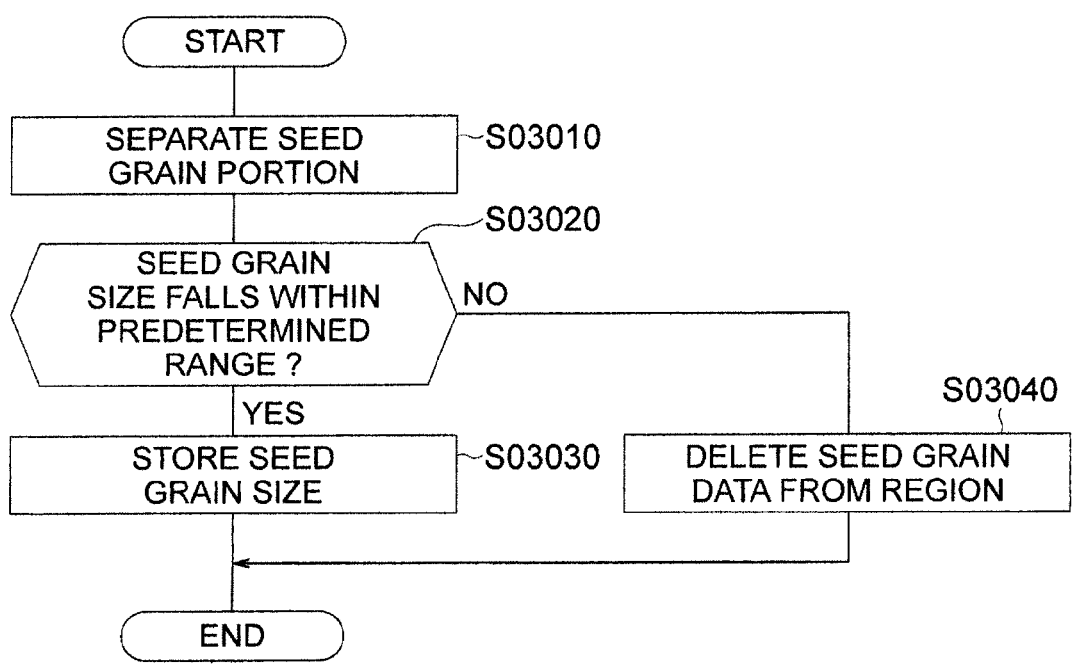
FIG. 3 is a flowchart illustrating detailed processing in Step S030 of FIG. 2.

FIG. 3 is a flowchart illustrating the detailed processing in Step S030 of FIG. 2.

In Step S03010 of FIG. 3, the portion extracting unit 103 separates the seed grains of the panicle from the branches in the binarized panicle image. The processing for separating the seed grains of the panicle from the branches may be performed by utilizing separation processing function included in commercially available image processing software. For example, the seed grains may be separated from the branches by contraction and expansion processing. For the contraction and expansion processing, for example, Japanese patent Application Laid-Open No. 2005-83775 discloses processing for selecting grains.

In Step S03020 of FIG. 3, the portion extracting unit 103 determines whether a size of a seed grain falls within a predetermined range. The determination whether the size of the seed grain falls within the predetermined range may be made as follows. A circumscribed circle and an inscribed circle are obtained in each seed grain region. As used herein, the circumscribed circle means a minimum circle including the whole seed grain region, and the inscribed circle means a maximum circle included in the seed grain region. A diameter of the circumscribed circle corresponds to a length of the seed grain. A diameter of the inscribed circle corresponds to a width of the seed grain. For example, it is assumed that the size of the seed grain falls within the predetermined range when the diameter of the circumscribed circle is 10 mm or less while the diameter of the inscribed circle is 1 mm or more. When the size of the seed grain falls within the predetermined range, the flow goes to Step S03030. When the size of the seed grain does not fall within the predetermined range, the flow goes to Step S03040.

In Step S03030 of FIG. 3, the portion extracting unit 103 stores the data of the seed grain.

In Step S03040 of FIG. 3, the portion extracting unit 103 deletes the data of the seed grain from the region.

Figure 16:
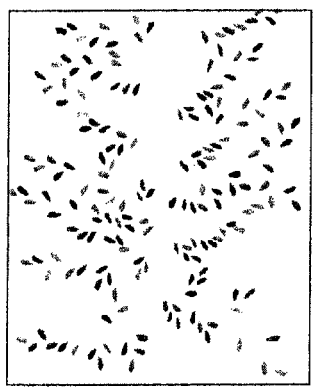
FIG. 16 illustrates an example of an image of an extracted seed grains.

FIG. 16 illustrates an example of the image of the extracted seed grains. The portion extracting unit 103 stores the image of the extracted seed grains in the work file 111.

Figure 4:
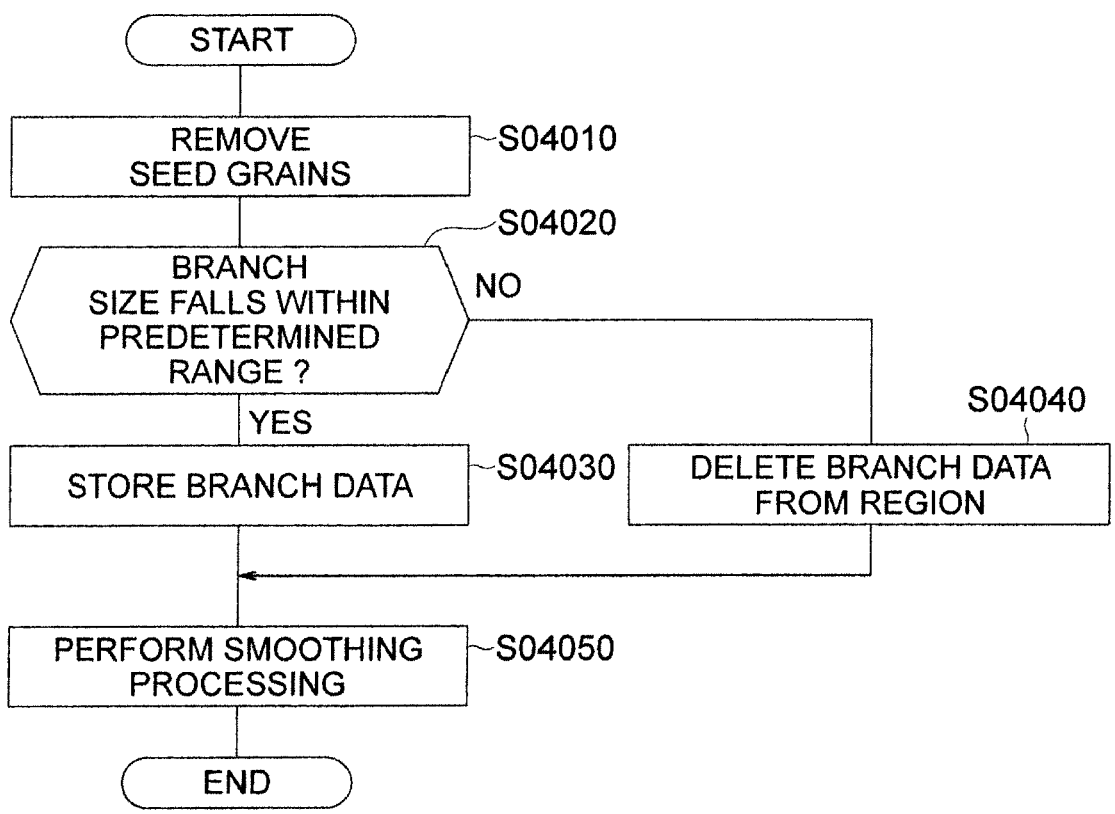
FIG. 4 is a flowchart illustrating detailed processing in Step S040 of FIG. 2.

FIG. 4 is a flowchart illustrating the detailed processing in Step S040 of FIG. 2.

In Step S04010 of FIG. 4, the portion extracting unit 103 removes the seed grains from the binarized panicle image.

In Step S04020 of FIG. 4, the portion extracting unit 103 determines whether a branch size such as a branch thickness falls within a predetermined range. When the branch size falls within the predetermined range, the flow goes to Step S04030. When the branch size does not fall within the predetermined range, the flow goes to Step S04040.

In Step S04030 of FIG. 4, the portion extracting unit 103 stores the data of the branch.

In Step S04040 of FIG. 4, the portion extracting unit 103 deletes the data of the branch from the region.

In Step S04050 of FIG. 4, the portion extracting unit 103 performs rounding (smoothing) processing to the stored data of the branches.

Figure 17:
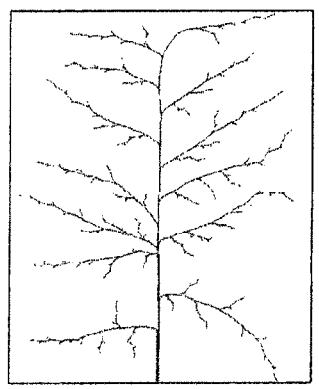
FIG. 17 illustrates an example of an image of extracted branches.

FIG. 17 illustrates an example of the image of the extracted branches. The portion extracting unit 103 stores the image of the extracted branches in the work file 111.

Figure 5:
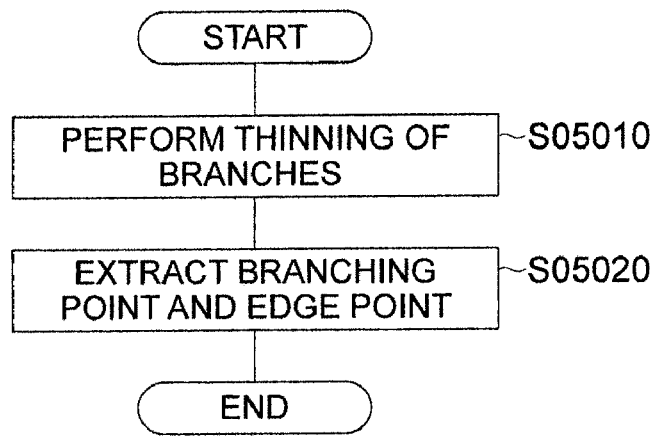
FIG. 5 is a flowchart illustrating detailed processing in Step S050 of FIG. 2.

FIG. 5 is a flowchart illustrating the detailed processing in Step S050 of FIG. 2.

In Step S05010 of FIG. 5, the portion extracting unit 103 performs thinning of the branches. The thinning means that the branches are expressed by a predetermined line while information on thicknesses of the branches are neglected.

In Step S05020 of FIG. 5, the portion extracting unit 103 extracts a branch branching point and an edge point. The branching point means a point at which the branch is branched, and the edge point means a point at which a seed grain should be produced in a leading edge of the branch.

Figure 6:
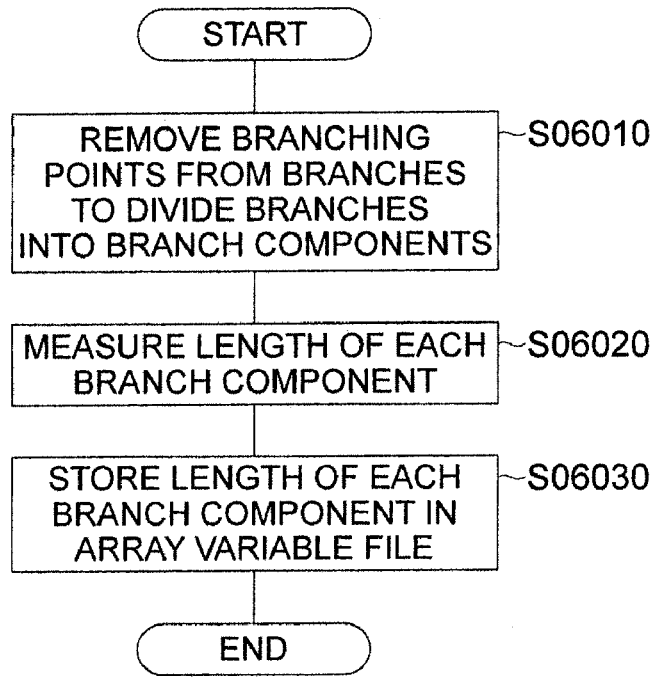
FIG. 6 is a flowchart illustrating detailed processing in Step S060 of FIG. 2.

FIG. 6 is a flowchart illustrating the detailed processing in Step S060 of FIG. 2.

In Step S06010 of FIG. 6, the portion extracting unit 103 remove the branching points the branching points from the branches and to divide the branches into branch components. As used herein, the branch component means a branch interval between the two branching points next to each other or between the branching point and the edge point next to each other.

In Step S06020 of FIG. 6, the portion extracting unit 103 measures the length of each branch component based on a pixel size.

In Step S06030 of FIG. 6, the portion extracting unit 103 stores a number, coordinates at both end points, and the length of each branch component in the array variable file 113.

In Step S070 of FIG. 2, the input/output unit 109 supports an operator in edit of the image data stored in the work file 111. Examples of the edit work include the deletion of the point, the addition of the point, the deletion of the line, the addition of the line, the deletion of the seed grain, the addition of the seed grain, a change from the branching point to the edge point, and a change from the edge point to the branching point. Specifically, the input/output unit 109 has a function of displaying the image stored in the work file 111 and a function of supporting the operator in the edit work using the displayed image. More specifically, for example, the edit processing may be performed by clicking with a mouse an icon indicating each edit support function and an edit target on a screen in which the image is displayed. The portion extracting unit 103 and the branching-state determination unit 105 perform reprocessing such as recalculation and redrawing by instructions of the operator through the input/output unit 109.

In Step S080 of FIG. 2, the input/output unit 109 supports the operator in specification of a panicle apex and a panicle neck. As used herein, the panicle apex means a boundary point of the branch component in the leading end portion of the panicle. The panicle neck means a boundary point of the branch component in a root portion of the panicle, and the panicle neck means a point that becomes a source of a structural analysis of the panicle as described later. A portion from the panicle neck to the panicle apex is referred to as rachis. The panicle apex and the panicle neck may automatically be specified through image processing because a diameter of the branch is slightly increased at the positions of the panicle apex and the panicle neck. However, in the embodiment, the operator can specify the panicle apex and the panicle neck. Specifically, for example, the input/output unit 109 displays the image that is stored in the work file 111 and in which the branches have been extracted, and the operator may specify the points indicating the panicle apex and panicle neck on the image by clicking with a mouse the points indicating the panicle apex and panicle neck. The input/output unit 109 stores pieces of positional data of the panicle apex and panicle neck, specified by the operator, in the array variable file 113.

Figure 7:
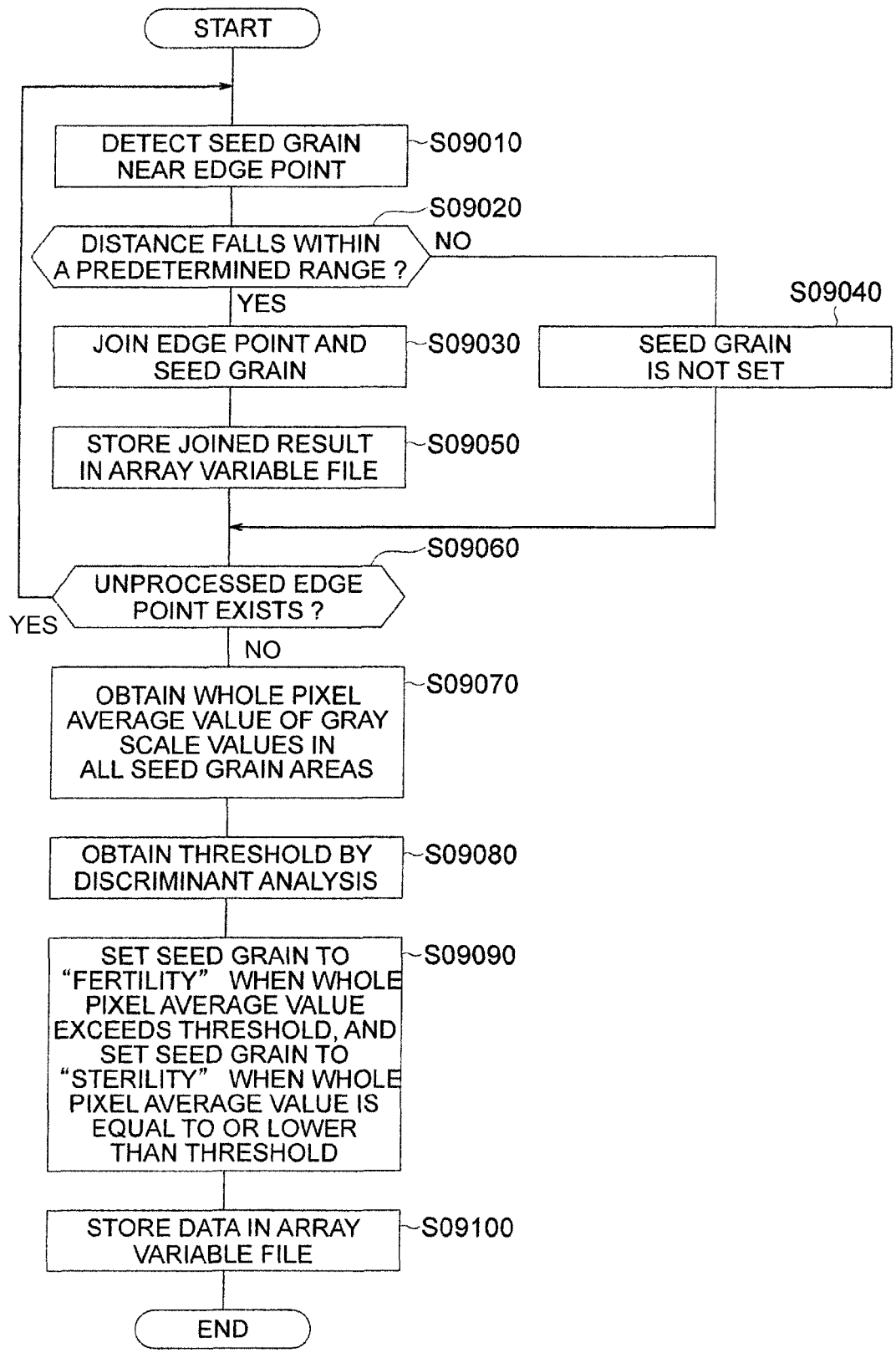
FIG. 7 is a flowchart illustrating detailed processing in Step S090 of FIG. 2.

FIG. 7 is a flowchart illustrating the detailed processing in Step S090 of FIG. 2.

In Step S09010 of FIG. 7, the portion extracting unit 103 detects a seed grain near the edge point.

In Step S09020 of FIG. 7, the portion extracting unit 103 determines whether a distance between the edge point and the seed grain falls within a predetermined range. When the distance between the edge point and the seed grain falls within the predetermined range, the flow goes to Step S09030. When the distance between the edge point and the seed grain does not fall within the predetermined range, the flow goes to Step S09040.

In Step S09030 of FIG. 7, the portion extracting unit 103 joins the edge point and the seed grain.

In Step S09050 of FIG. 7, the portion extracting unit 103 stores the joined result in the array variable file 113. Specifically, a number and the coordinates of the seed grain are correlated with the number of the branch component in the array variable file 113.

In Step S09040 of FIG. 7, the seed grain is not set.

In Step S09060 of FIG. 7, the portion extracting unit 103 determines whether an unprocessed edge point exists. When an unprocessed edge point does not exist, the flow goes to Step S09070. When an unprocessed edge point exists, the flow goes to Step S09010.

In Step S09070 of FIG. 7, the portion extracting unit 103 obtains a whole pixel average value of gray scale values in all seed grain areas.

In Step S09080 of FIG. 7, the portion extracting unit 103 obtains a threshold of the whole pixel average value by discriminant analysis. The threshold is obtained such that a between-class variance is maximized when the seed grains are classified into two classes by the threshold. For example, http://www.mm.media.kyoto-u.ac.jp/education/DIP/WEBPAGE_SECTION/section7/node2.html and Japanese Patent No. 4129598 disclose the discriminant analysis (paragraph 38 to 43, and 65).

In Step S09090 of FIG. 7, the portion extracting unit 103 sets the seed grain to "fertility" when the whole pixel average value of the gray scale values in the seed grain areas exceeds the threshold, and the portion extracting unit 103 sets the seed grain to "sterility" when the whole pixel average value of the gray scale values in the seed grain areas is equal to or lower than the threshold. The "fertility" state of the seed grain indicates that the rice grain exists in a husk, and the "sterility" state indicates that the rice grain does not exist in the husk.

In Step S09100 of FIG. 7, the portion extracting unit 103 stores the "fertility" or "sterility" result in the array variable file 113.

Figure 8:
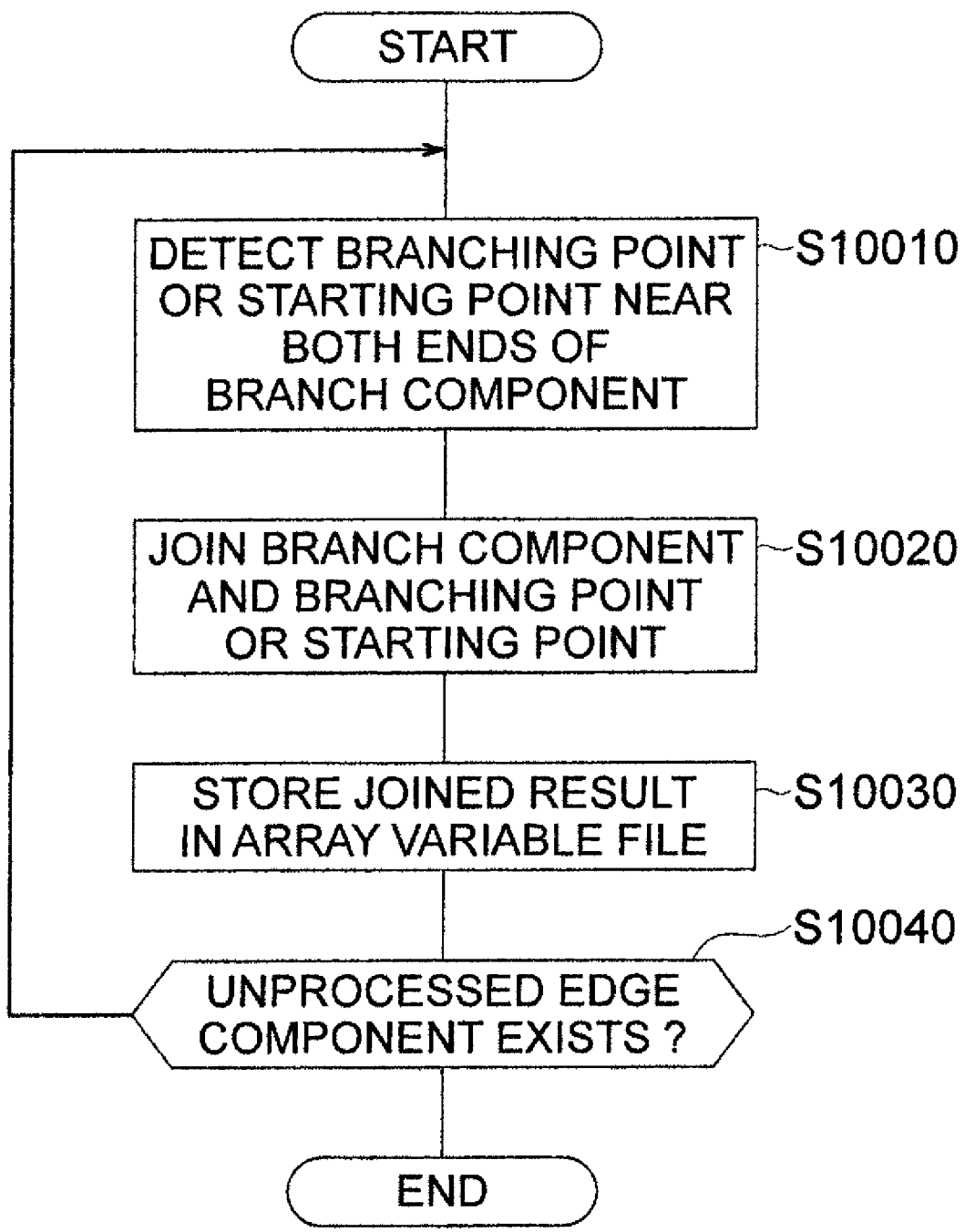
FIG. 8 is a flowchart illustrating detailed processing in Step S100 of FIG. 2.

FIG. 8 is a flowchart illustrating the detailed processing in Step S100 of FIG. 2.

In Step S10010 of FIG. 8, the portion extracting unit 103 detects a branching point or an edge point near both ends of the branch component.

In Step S10020 of FIG. 8, the portion extracting unit 103 joins the branch component and the branching point or edge point.

In Step S10030 of FIG. 8, the portion extracting unit 103 stores the joined result in the array variable file 113. Specifically, a number and coordinate of the branching point or edge point are correlated with the number of the branch component in the array variable file 113.

In Step S10040 of FIG. 8, the portion extracting unit 103 determines whether an unprocessed branch component exists. The processing is ended when an unprocessed branch component does not exist. When an unprocessed branch component exists, the flow returns to Step S10010.

Figure 9:
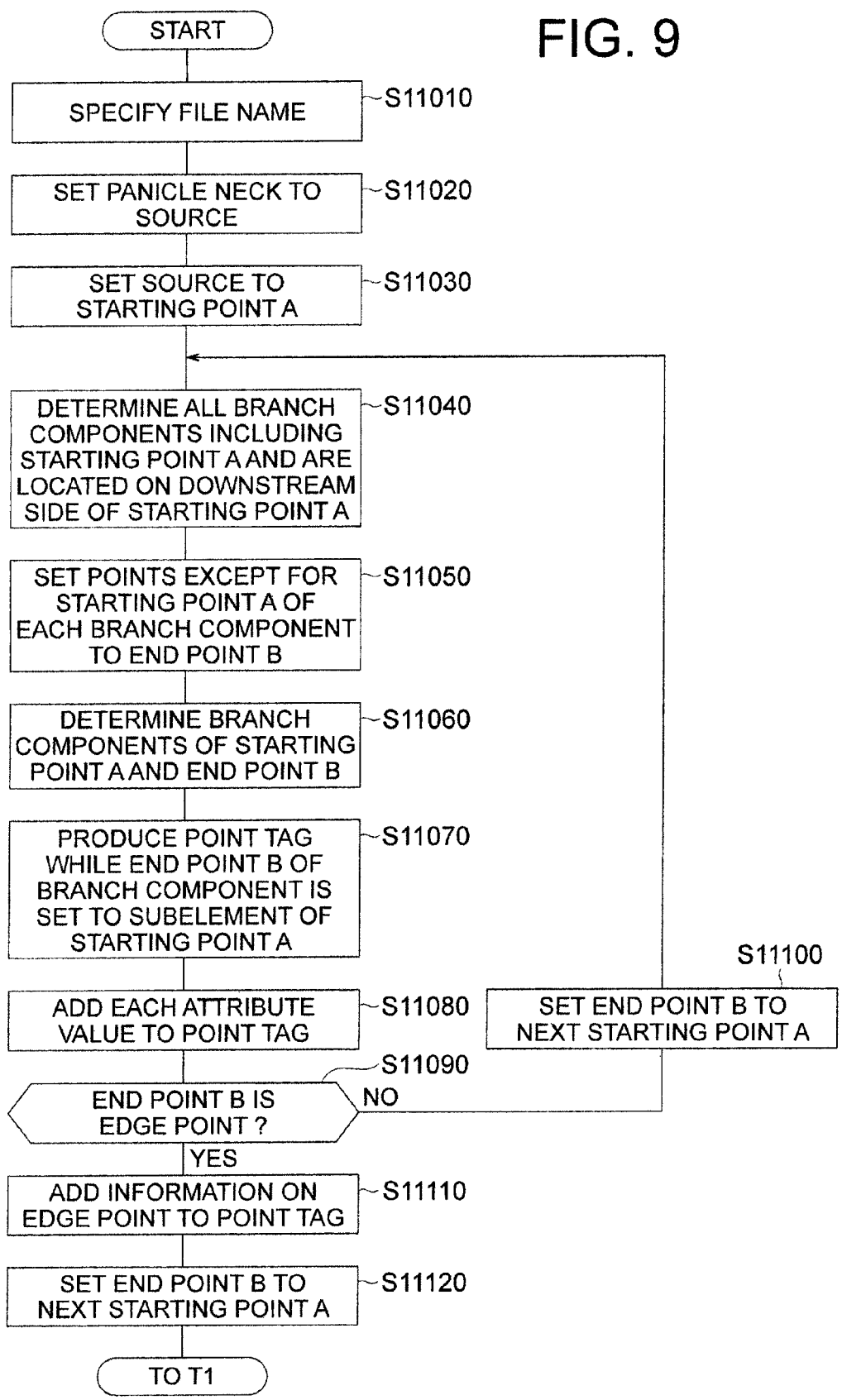
FIG. 9 is a flowchart illustrating detailed processing in Step S110 of FIG. 2.
Figure 10:
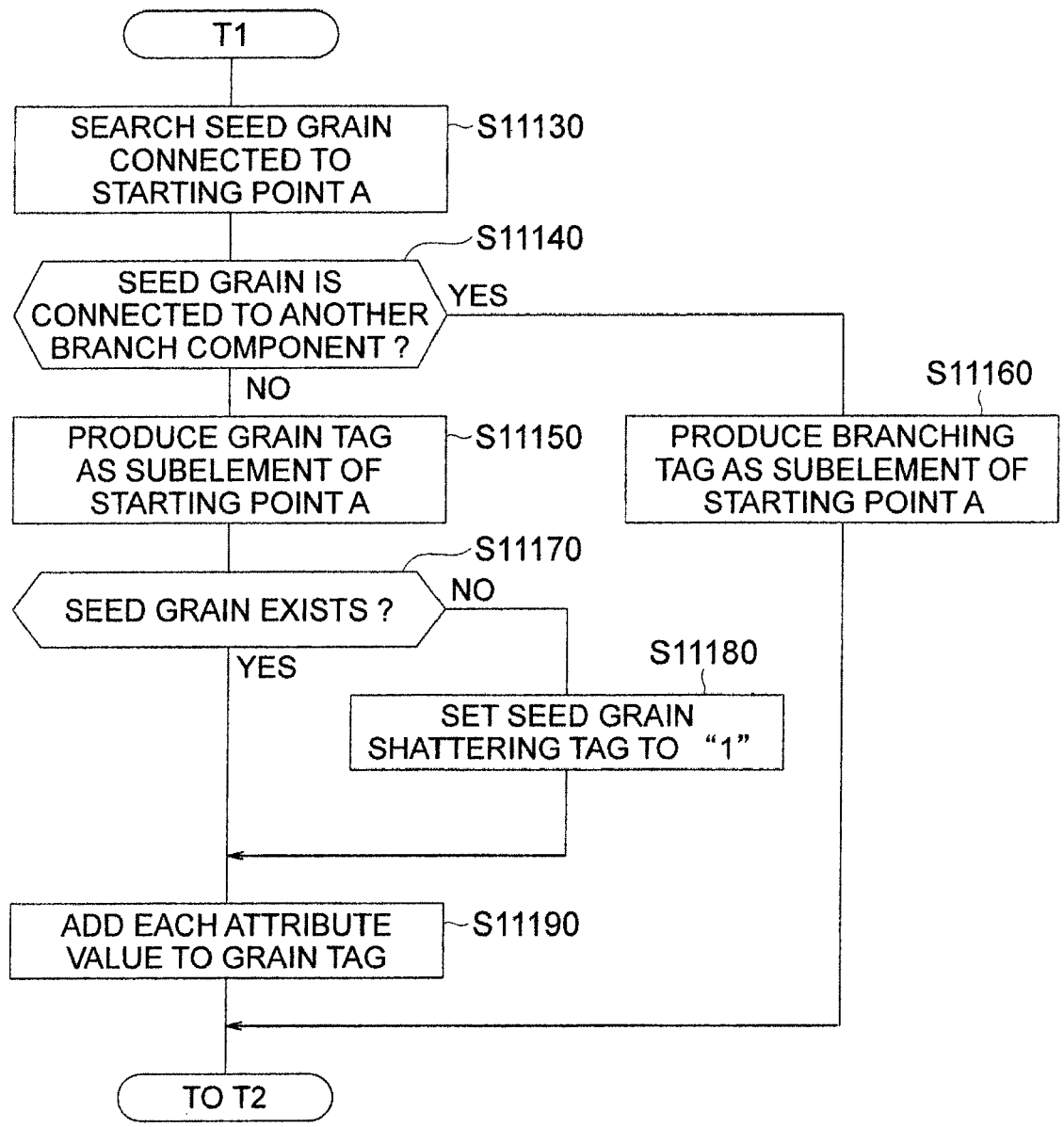
FIG. 10 is a flowchart illustrating the detailed processing in Step S110 of FIG. 2.
Figure 11:
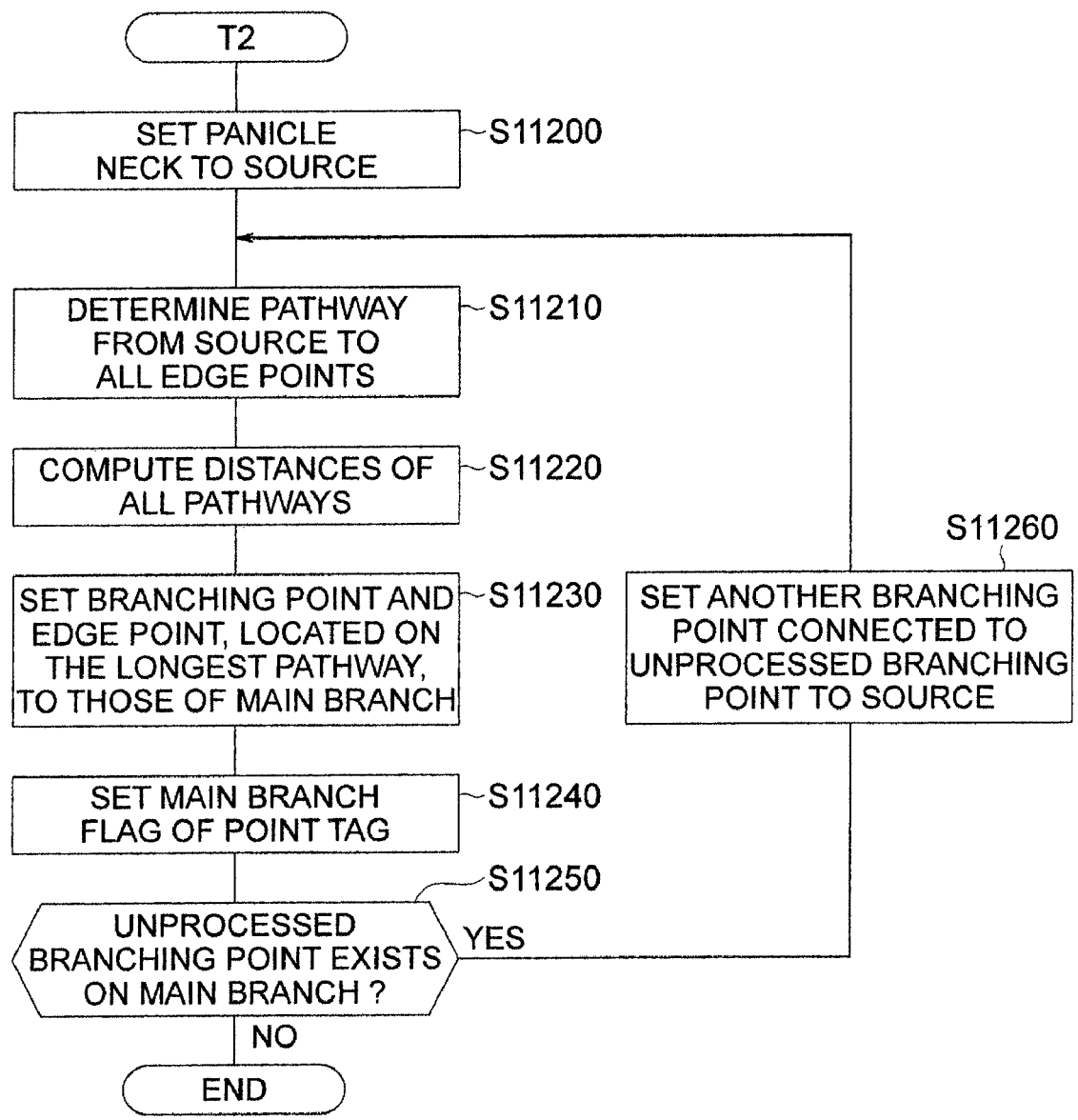
FIG. 11 is a flowchart illustrating the detailed processing in Step S110 of FIG. 2.

FIGS. 9 to 11 are flowcharts illustrating the detailed processing in Step S110 of FIG. 2.

In Step S11010 of FIG. 9, the branching-state determination unit 105 specifies a file name of the morphology data file 115. The branching-state determination unit 105 performs processing using the data of the array variable file 113, produced by the portion extracting unit 103, to produce the morphological data file 115. The morphological data file 115 includes point tags corresponding to branching points and edge points as elements, and the point tags are correlated to each other. Each point tag has information. The morphological data file 115 is preferably produced in the form of XML file. The XML file is a data file having a tree structure. For example, Japanese Patent No. 3492247 discloses the XML file.

In Step S11020 of FIG. 9, the branching-state determination unit 105 sets the panicle neck to the source. As used herein, the source means a point at which the panicle analysis processing is started. The source is set to an uppermost stream point, and the direction far away from the source is set to a downstream direction.

In Step S11030 of FIG. 9, the branching-state determination unit 105 sets the source to a starting point A to produce the point tag of the starting point A. As used herein, the starting point means an end point on the upstream side of the branch component. The branching-state determination unit 105 adds an attribute value of the starting point A to the point tag of the starting point A. The attribute value includes a coordinate of the starting point A. The data of the attribute value can be obtained from the array variable file 113.

In Step S11040 of FIG. 9, the branching-state determination unit 105 determines all the branch components which include the starting point A, and are located on the downstream side of the starting point A.

In Step S11050 of FIG. 9, the branching-state determination unit 105 sets points except for the starting point A of each branch component to an end point B (B1, B2, . . . , and Bn). At this point, n is the number of branch components that include the starting point A and are located on the downstream side of the starting point A.

In Step S11060 of FIG. 9, the branching-state determination unit 105 determines the branch components of the starting point A and end points B (B1, B2, . . . , and Bn).

In Step S11070 of FIG. 9, the branching-state determination unit 105 produces the point tag of the end point B (B1, B2, . . . , and Bn) as a subelement of the point tag of the starting point A in the morphology data file 115.

In Step S11080 of FIG. 9, the branching-state determination unit 105 adds the attribute values of the end point B and a branch component AB to the point tag of the end point B (B1, B2, . . . , and Bn). The attribute value includes the coordinates of the end point B and the length of the branch component AB. The attribute value data can be obtained from the array variable file 113.

In Step S11090 of FIG. 9, the branching-state determination unit 105 determines whether the end point B (B1, B2, . . . , and Bn) is the edge point. When the end point B is the edge point, the flow goes to Step S11110. When the end point B is not the edge point, the flow goes to Step S11100.

In Step S11100 of FIG. 9, the branching-state determination unit 105 sets the end point B to the next starting point A. Then the flow goes to Step S11040.

In Step S11110 of FIG. 9, the branching-state determination unit 105 adds the information on the edge point to the point tag of the end point B.

Therefore, the point tags of all the branch components from the source to the edge point are produced in the morphological data file 115.

In Step S11120 of FIG. 9, the branching-state determination unit 105 sets the end point B to the next starting point A. Then the flow goes to Step S11130.

In Step S11130 of FIG. 10, the branching-state determination unit 105 searches a seed grain connected to the starting point A that is of the edge point.

In Step S11140 of FIG. 10, the branching-state determination unit 105 determines whether the seed grain is connected to another branch component. When the seed grain is connected to another branch component, the flow goes to Step S11160. When the seed grain is not connected to another branch component, the flow goes to Step S11150.

In Step S11160 of FIG. 10, the branching-state determination unit 105 produces a branching tag as the subelement of the point tag of the starting point A. As used herein, the branching tag means a tag that specifies a file name of another file indicating another branch. Sometimes the panicle is branched in many branches and the panicle branching structure cannot be spread in one sheet. In such cases, a primary rachis-branch is separated from the rachis, the primary rachis-branch is separately analyzed (measured), and the analysis result is stored in another file (morphological data file). At this point, the branching tag is used.

In Step S11150 of FIG. 10, the branching-state determination unit 105 produces a grain tag as a subelement of the point tag of the starting point A. The grain tag means a subelement of the point tag of the edge point, and the grain tag means a tag having the information on the seed grain.

In Step S11170 of FIG. 10, the branching-state determination unit 105 determines whether a seed grain exists. When a seed grain exists, the flow goes to Step S11190. When a seed grain does not exist, the flow goes to Step S11180.

In Step S11180 of FIG. 10, the branching-state determination unit 105 sets an seed grain shattering tag to "1" to indicate that the seed grain does not exist. The seed grain drop means the state in which the seed grain has shattered from the panicle. Then the flow goes to Step S11190.

In Step S11190 of FIG. 10, the branching-state determination unit 105 adds each attribute value to the grain tag. Each attribute value is character information indicating the seed grain state, and each attribute value includes the grain size of the seed grain, "fertility" or "sterility" state of the seed grain, and information on degenerated spikelet. The grain size of the seed grain includes the length and the width. The length and the width of the seed grain are measured through the processing in Step S3020 of FIG. 3. As described above, the "fertility" state of the seed grain indicates the state in which the rice grain exists in the husk, and the "sterility" state indicates that the rice grain does not exist in the husk. The determination of the "fertility" or "sterility" state is made through the pieces of processing in Steps S09070 to S09100 of FIG. 7. The degenerated spikelet expresses the state in which a flower produces no fruit. The operator may feed the information on the degenerated spikelet in Step S070 of FIG. 2.

Thus, the grain tags or branching tags of all the edge points are produced in the morphological data file 115.

In Step S11200 of FIG. 11, the branching-state determination unit 105 sets the panicle neck to the source.

In Step S11210 of FIG. 11, the branching-state determination unit 105 determines pathways from the source to all the edge points using the morphological data file 115.

In Step S11220 of FIG. 11, the branching-state determination unit 105 computes distances of all the pathways using the morphological data file 115.

In Step S11230 of FIG. 11, the branching-state determination unit 105 sets the branching points and edge points, located on the longest pathway including the source, to the branching point and edge point of the main branch in the morphological data file 115. The main branch including the source that is of the panicle neck is the rachis. A bifurcated branch bifurcated from the rachis is referred to as primary rachis-branch, a bifurcated branch bifurcated from the primary rachis-branch is referred to as secondary rachis-branch, and a bifurcated branch bifurcated from the secondary rachis-branch is referred to as tertiary rachis-branch. When the panicle apex is specified, the branch connecting the panicle neck and the panicle apex may be set to the rachis.

In Step S11240 of FIG. 11, the branching-state determination unit 105 sets a main branch flags included in the point tags of the branching point and edge point, which are determined to be on the main branch, in the morphological data file 115. The main branch flag included in the point tag is set when the branching point or edge point corresponding to the point tag is located on the main branch.

In Step S11250 of FIG. 11, the branching-state determination unit 105 determines whether an unprocessed branching point exists on the main branch in the morphological data file 115. The unprocessed branching point means a branching point connected to the downstream bifurcated branch in which the pathway distance is not computed. When an unprocessed branching point does not exist on the main branch, the processing is ended. When an unprocessed branching point exists on the main branch, the flow goes to Step S11260.

In Step S11260 of FIG. 11, the branching-state determination unit 105 sets another branching point connected to the unprocessed branching point to the source. Then the flow goes to Step S11210.

A configuration of the morphology data file 115 will be described below in comparison with the branch branching state.

Figure 13:
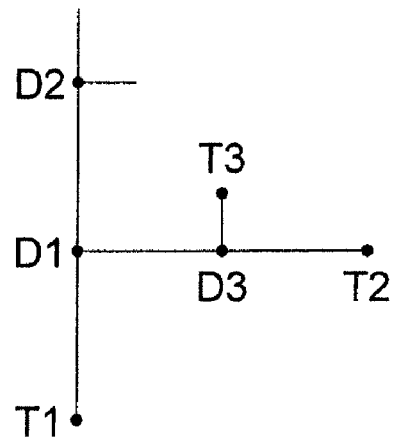
FIG. 13 illustrates an example of a branch branching state.

FIG. 13 illustrates an example of the branch branching state. In FIG. 13, the numeral T1 designates a source, and the numeral T2 designates a edge point. The numerals D1, D2, and D3 designate branching points.

Figure 14:
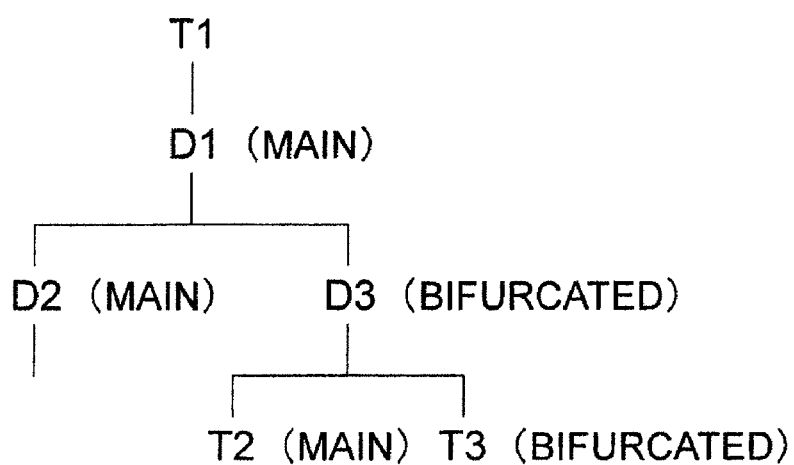
FIG. 14 illustrates a configuration of a morphological data file corresponding to the branch branching state of FIG. 13.

FIG. 14 illustrates a configuration of a morphological data file corresponding to the branch branching state of FIG. 13. The morphological data file has a tree structure including the point tags corresponding to the source, the edge point, and the branching point as elements. The point tags except for the point tag of the source constitute subelements of other point tags. Thus, all the point tags are correlated with one another by a parent and child relationship, that is, a hierarchical relationship in which the parent is set to an upper level while the child is set to a lower level. Each point tag includes information on the corresponding branching point and information on the branch component.

In FIG. 14, specifically, the numerals T1 and D1 designate point tags corresponding to the source T1 and branching point D1. The point tag T1 has the point tag D1 as a subelement, the point tag D1 has the point tags D2 and D3 as subelements, and the point tag D3 has the point tags T2 and T3 as subelements. Subelements of the point tag D2 is not illustrated. In FIG. 14, (main) indicates that the main branch flag is set, and (bifurcated) indicates that the main branch flag is not set. For example, D2 (main) indicates that a branch component D1-D2 is the main branch based on D1. On the other hand, D3 (bifurcated) indicates that a branch component D1-D3 is the bifurcated branch based on D1. Assuming that a branch component T1-D1 is the rachis, the branch component D1-D3 is a primary rachis-branch and branch component D3-T3 is a secondary rachis-branch. Thus, on the pathway from the source to the point in question, the order of a rachis-branch can be determined by the number of main branch flags that are not set.

FIGS. 18 to 23 illustrate examples of the panicle scheme that is produced by the branching-state determination unit 105 by utilizing only the information in the morphological data file 115.

Figure 18:
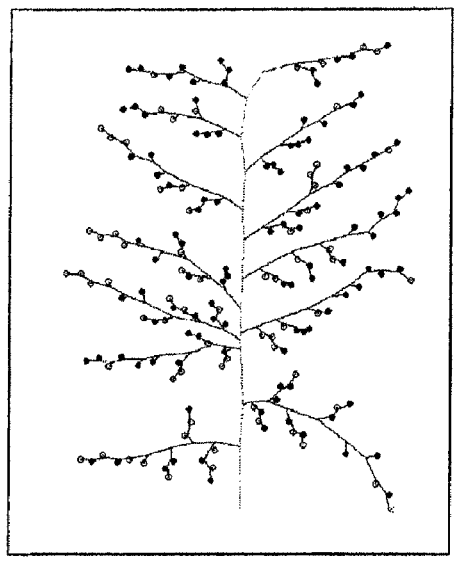
FIG. 18 illustrates an example of a panicle scheme in which positional information of branch components is used.

FIG. 18 illustrates an example of a panicle scheme in which the positional information on the branch components is used.

Figure 19:
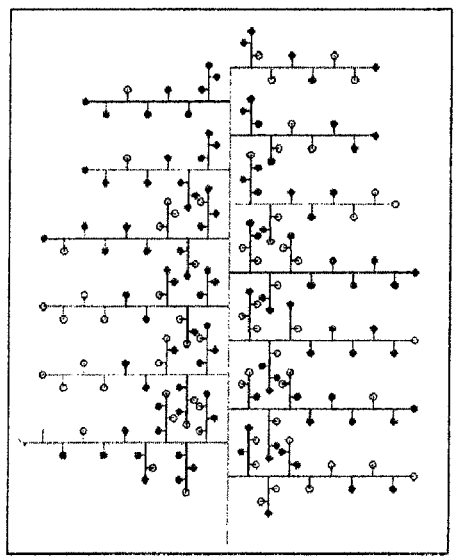
FIG. 19 illustrates an example of a panicle scheme that is typified not using the positional information and length information of the branch components

FIG. 19 illustrates an example of a panicle scheme that is typified not using the positional information and length information of the branch components. Lengths of the branch components are set to predetermined values determined according to the order of rachis-branches.

Figure 20:
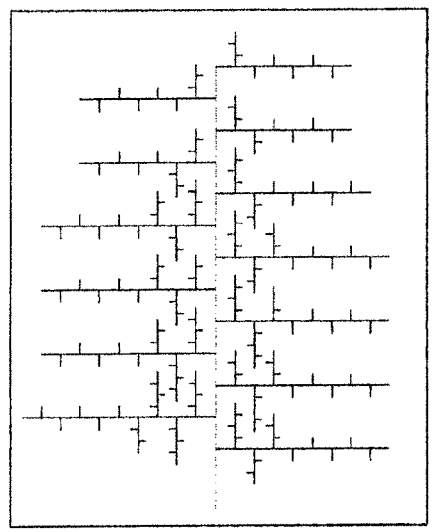
FIG. 20 illustrates an example of a panicle scheme that is typified when the branches alone are left while the seed grains are removed from the panicle scheme of FIG. 19.

FIG. 20 illustrates an example of a panicle scheme that is typified when the branches alone are left while the seed grains are removed from the panicle scheme of FIG. 19.

Figure 21:
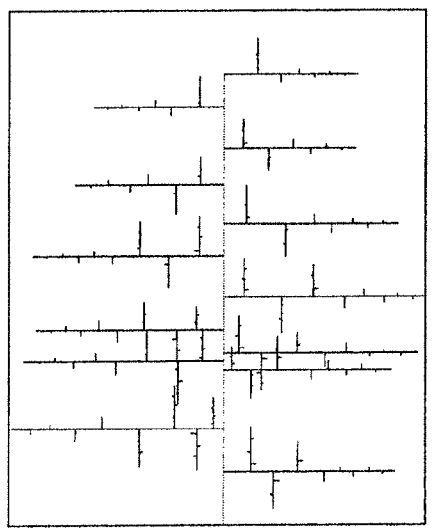
FIG. 21 illustrates an example of a panicle scheme that is typified using the length information of the branch components when the branches alone are left while the seed grains are removed.

FIG. 21 illustrates an example of a panicle scheme that is typified using the length information of the branch components when the branches alone are left while the seed grains are removed.

Figure 22:
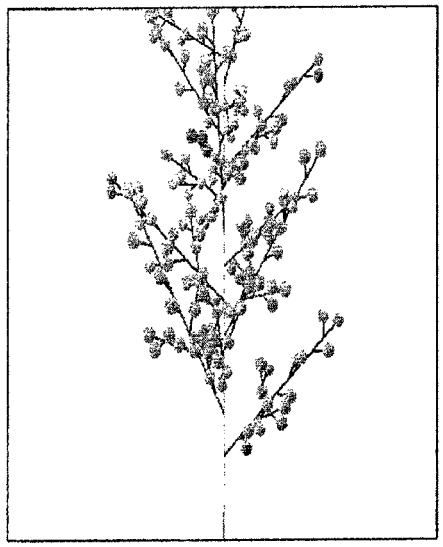
FIG. 22 illustrates an example of a panicle scheme that is stereoscopically-typified using the length information of the branch components.

FIG. 22 illustrates an example of a panicle scheme that is stereoscopically (three-dimensionally)-typified using the length information on the branch component. In producing the stereoscopically-typified panicle scheme, predetermined fixed values are used as an angle between the bifurcated branch and the main branch and a direction in which the bifurcated branch is extended.

Figure 23:
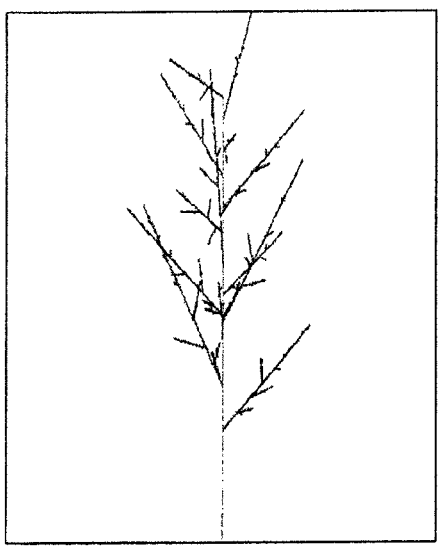
FIG. 23 illustrates an example of a panicle scheme that is stereoscopically-typified using the length information of the branch components when the branches alone are left while the seed grains are removed.

FIG. 23 illustrates an example of a panicle scheme that is stereoscopically-typified using the length information of the branch components when o the branches alone are left while the seed grains are removed.

Figure 12:
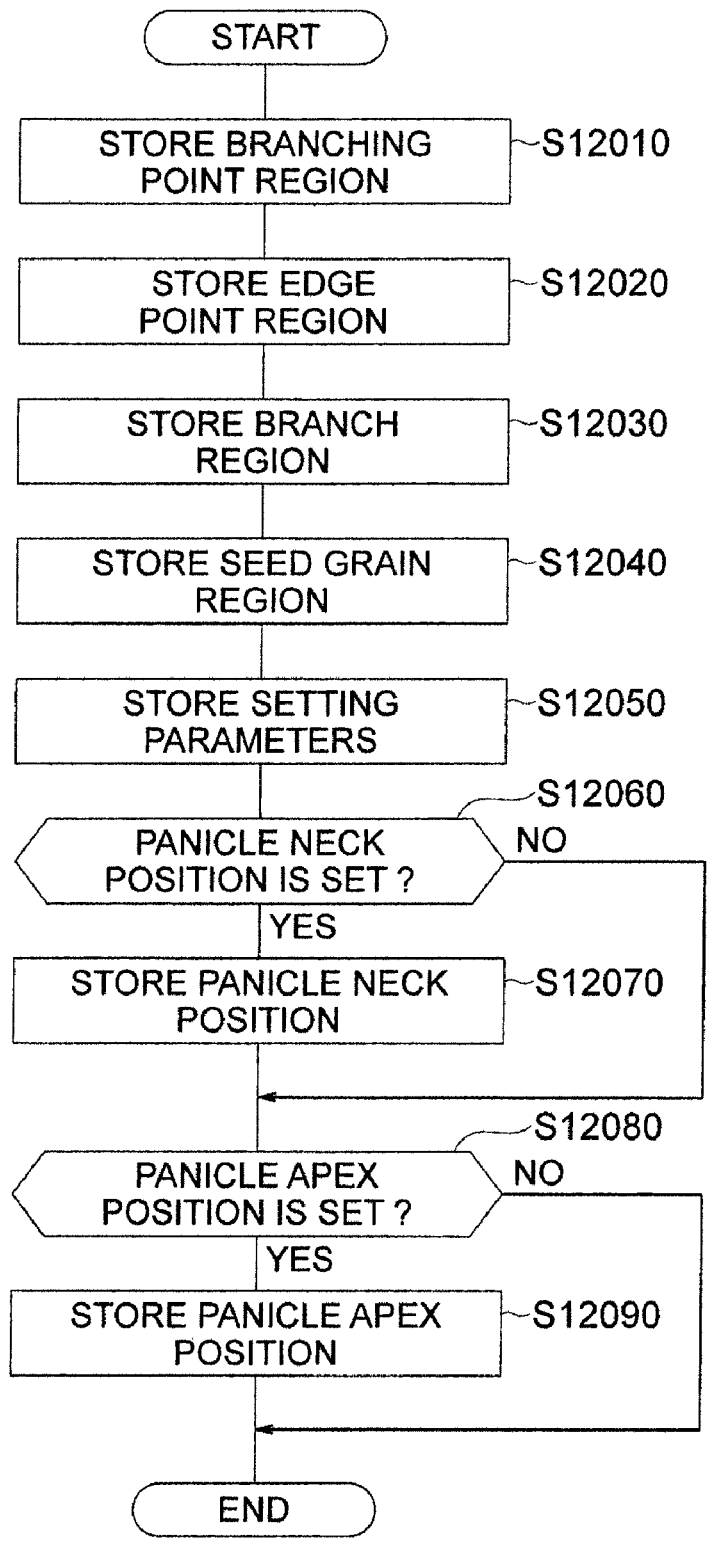
FIG. 12 is a flowchart illustrating detailed processing in Step S120 of FIG. 2.

FIG. 12 is a flowchart illustrating the detailed processing in Step S120 of FIG. 2.

In Step S12010 of FIG. 12, the data management unit 107 stores the branching point region in the retention file 117.

In Step S12020 of FIG. 12, the data management unit 107 stores the edge point region in the retention file 117.

In Step S12030 of FIG. 12, the data management unit 107 stores the branch region in the retention file 117.

In Step S12040 of FIG. 12, the data management unit 107 stores the seed grain region in the retention file 117.

In Step S12050 of FIG. 12, the data management unit 107 stores setting parameters in the retention file 117. The setting parameters mean upper and lower limit values of predetermined ranges of the seed grain size and branch size and the like.

In Step S12060 of FIG. 12, the data management unit 107 determines whether a panicle neck position is set. When the panicle neck position is set, the flow goes to Step S12070. When the panicle neck position is not set, the flow goes to Step S12080.

In Step S12070 of FIG. 12, the data management unit 107 stores the panicle neck position in the retention file 117.

In Step S12080 of FIG. 12, the data management unit 107 determines whether a panicle apex position is set. When the panicle apex position is set, the flow goes to Step S12090. When the panicle apex position is not set, the processing is ended.

In Step S12090 of FIG. 12, the data management unit 107 stores the panicle apex position in the retention file 117.

After the work is interrupted, the processing can easily be resumed by storing the edit state in the above-described manner.

In the embodiment, the work for digitizing the panicle morphology can largely be reduced, and the skilled work is not required. The length of a curved branch, which is hardly measured in a manual fashion, can also be measured. For the panicle that cannot be spread once because of many grains, the panicle can be analyzed (measured) while the rachis and the primary rachis-branch are divided.

In the embodiment, the parameters concerning the panicle morphology are collected in the morphological data file 115. Accordingly, when the property of the panicle morphology is analyzed, conveniently the morphological data file 115 can repeatedly be utilized without performing remeasurement of the panicle morphology. Various two-dimensional and three-dimensional panicle schemes of FIGS. 20 to 23 can be produced from the morphological data file 115, so that the panicle morphology can easily be recognized.

In the embodiment, the rice panicle is described by way of example. However, the analysis method and analysis apparatus of the invention can also be applied to a panicle of grains (plants) except for the rice.

I claim:

1. An analysis method for analyzing a branching structure of a panicle, the analysis method comprising:
   capturing, by an analysis apparatus that comprises at least one computer, a panicle image;
   extracting, by the analysis apparatus, branches and seed grains from the panicle image; and
   determining, by the analysis apparatus, a branching state of the branches;
   wherein determining the branching state of the branches includes storing, by the analysis apparatus, the branching state of the branches in a data file, the data file having a tree structure corresponding to the branching state of the branches;
   wherein determining the branching state of the branches comprises:
   setting a root of the panicle to an upstream side;
   determining an initial starting point on a branch near the root of the panicle;
   setting a branching point of the branch or an edge point of the branch on a downstream side of the initial starting point to an end point, the branching point or the edge point being next to the initial starting point, the edge point being a point at which a seed grain is produced;
   setting a region from the initial starting point to the end point to a branch component;
   determining another branch component while the end point is set to a new starting point when the end point is a branching point; and
   dividing the whole of the branches of the panicle into branch components;
   the method further comprising:
   obtaining a whole pixel average value of gray scale values in all seed grain areas;
   obtaining a threshold by discriminant analysis; and
   determining the seed grain to be a state of "fertility" when the whole pixel average value exceeds the threshold, and determining the seed grain to be a state of "sterility" when the whole pixel average value does not exceed the threshold.

2. The analysis method according to claim 1, wherein the data file includes point tags corresponding to all the branching points and edge points,
   a point tag corresponding to a branching point includes a point tag corresponding to an end point of a branch component, in which the branching point is set to a starting point, as a subelement, and
   the point tags corresponding to all the branching points and edge points have information on a length from the next, upstream branching point and form a tree structure.

3. The analysis method according to claim 2, wherein a point tag corresponding to a branching point or an edge point have information on the branching point or edge point and information on the branch component in which the branching point or edge point is set to an end point.

4. The analysis method according to claim 2, wherein a point tag corresponding to an edge point has information on a seed grain as a subelement.

5. The analysis method according to claim 4, wherein the information on the seed grain includes character information indicating a seed grain state as the subelement.

6. The analysis method according to claim 1, wherein determining the branching state of the branches includes:
   setting a branch including a branch component to a main branch located on a downstream side of a starting point, the branch component connecting an edge point and the starting point, the edge point having a longest distance from the starting point; and
   setting a branch bifurcated from the main branch to a bifurcated branch of the main branch.

7. The analysis method according to claim 6, wherein the data file includes point tags corresponding to all the branching points and edge points,
   a point tag corresponding to a branching point includes a point tag corresponding to an end point of the branch component, in which the branching point is set to a starting point, as a subelement,
   the point tag corresponding to the branching point or edge point has information on the branching point or edge point and information on the branch component in which the branching point or edge point is set to an end point, and
   the information on the branch component includes information whether the branch component is a main branch or a bifurcated branch.

8. An analysis apparatus that analyzes a branching structure of a panicle, the analysis apparatus comprising:
   an image capturing unit configured to capture a panicle image;
   a portion extracting unit configured to extract branches and seed grains from the panicle image;
   a branching-state determination unit configured to determine a branching state of the branches; and
   a data file that has a tree structure corresponding to the branching state of the branches,
   wherein the branching-state determination unit is further configured to store the branching state of the branches in the data file,
   wherein at least one of the portion extracting unit, or the branching-state determining unit comprises at least one computer,
   wherein the branching-state determination unit is further configured to:
      set a root of the panicle to an upstream side;
      determine an initial starting point on a branch near the root of the panicle;
      set a branching point of the branch or an edge point of the branch on a downstream side of the initial starting point to an end point, the branching point or the edge point being next to the initial starting point, the edge point being a point at which a seed grain is produced;
      set a region from the initial starting point to the end point to a branch component;
      determine another branch component while the end point is set to a new starting point when the end point is a branching point; and
      divide the whole of the branches of the panicle into branch components; and
   wherein the portion extracting unit is further configured to:
      obtain a whole pixel average value of gray scale values in all seed grain areas:
      obtain a threshold by discriminant analysis; and
      determine the seed grain to be a state of "fertility" when the whole pixel average value exceeds the threshold, and determine the seed grain to be a state of "sterility" when the whole pixel average value does not exceed the threshold.

* * * * *